United States Patent [19]

Provi

[11] 4,082,153
[45] Apr. 4, 1978

[54] DIGITAL TYPE FLOOR SCALE WITH WEIGH CYCLE CONTROL

[75] Inventor: Mike A. Provi, Rockford, Ill.

[73] Assignee: The Brearley Company, Rockford, Ill.

[21] Appl. No.: 773,389

[22] Filed: Mar. 2, 1977

[51] Int. Cl.² .................. G01G 23/30; G01G 3/14
[52] U.S. Cl. .................. 177/177; 177/210 FP; 177/DIG. 3
[58] Field of Search ............ 177/177, 178, 210 R, 177/210 FP, DIG. 3

[56] References Cited

U.S. PATENT DOCUMENTS

| 3,838,744 | 10/1974 | Tanji et al. | 177/177 |
| 3,853,191 | 12/1974 | Yamagiwa | 177/210 FP |
| 3,967,690 | 7/1976 | Northcutt | 177/DIG. 3 |

Primary Examiner—George H. Miller, Jr.
Attorney, Agent, or Firm—Morsbach & Pillote

[57] ABSTRACT

A floor scale for measuring body weight having a scale base, a foot platform, an electronic digital weighing system for producing a digital display indicative of the weight applied to the scale platform, and a power switch for controlling the application of power to the electronic digital display system. A weigh cycle control is provided including a kick bar mounted on the scale base at one side of the scale for movement in a generally horizontal direction and adapted to be actuated by the foot of a person before mounting the foot platform, a momentary contact type switch mounted on the scale base for actuation by the kick bar and a timer operated by the momentary contact switch for maintaining the application of power to the electronic digital weighing system for a preselected time interval sufficient for a weighing operation. The electronic digital display system can be of the type in which the weight sensor produces a series of pulses correlative with the weight applied to the foot platform of the scale and a counter for counting the pulses, and the weigh cycle control can include means responsive to operation of the momentary contact type switch means for also resetting the counter.

8 Claims, 4 Drawing Figures

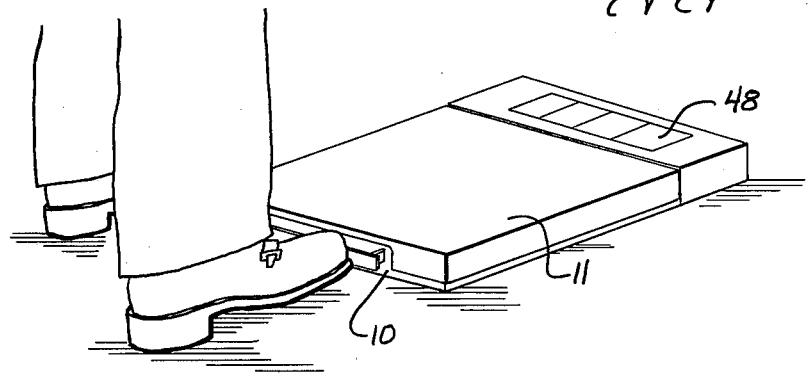
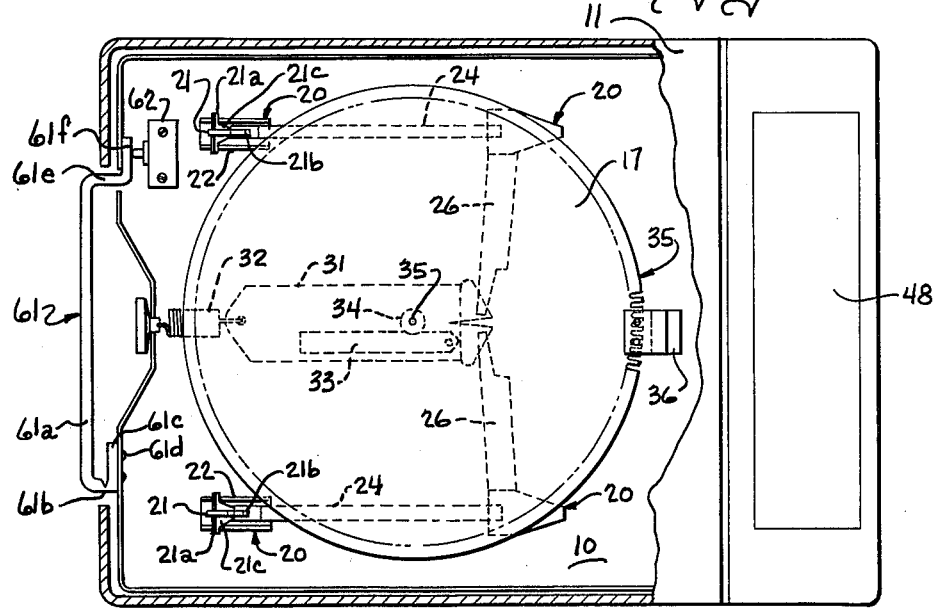
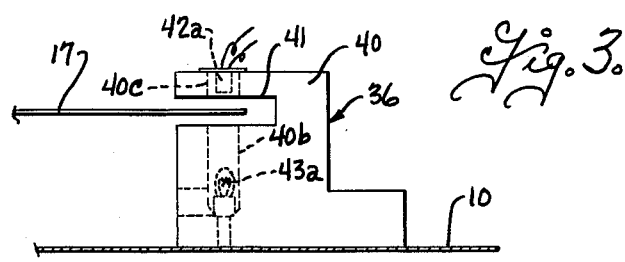

DIGITAL TYPE FLOOR SCALE WITH WEIGH CYCLE CONTROL

BACKGROUND OF THE INVENTION

Scales with various different electronic digital weighing systems have heretofore been utilized. In one type of digital weighing system, herein sometimes referred to as a direct dial position sensing system such as shown in U.S. Pat. No. 3,853,191, a coded dial is moved through a distance correlative with the weight applied to the scale and the dial is provided with a code pattern in the form of a series of concentric tracks and an associated bank of sensing components for sensing a code pattern on the dial when it comes to rest, to produce a digital signal indicative of the position of the coded dial and hence of the weight on the scale. In another type of electronic digital weighing system herein sometimes referred to as a scanning type dial position sensing system such as shown in U.S. Pat. No. 3,927,726, the weigh scale has a scale member that is rotated through an angle corresponding to the weight applied to the scale and the position of the scale member is sensed by a servo-type scanner that is driven to follow the movement of the scale member and produce a series of pulses correlative with the angular movement of the servo scanner. The pulses produced by the scanner are then counted as an indication of the position of the scale member and hence the weight applied to the scale. In still another type of electronic digital weighing system, herein sometimes referred to as an incremental type dial motion measuring system, for example as shown in U.S. Pat. Nos. 3,612,842 and 3,740,536, a scale dial is provided with a single track that cooperates with a sensor to produce a series of pulses as the scale dial is moved under the weight on the scale, and the series of pulses are counted as an indication of the applied weight. In order to accommodate oscillation and overshoot of the scale dial, an up-down counter is used and operated as an up counter in response to rotation of the dial in one direction and as a down counter in response to rotation of the dial in the opposite direction. In yet another type of electronic digital weighing system, herein sometimes referred to as an analog-digital weighing system, for example as shown in U.S. Pat. No. 3,582,619, the weight applied to the scale platform is sensed by an analog transducer such as a load cell that produces an analog electrical output signal correlative with the applied weight, and the analog electrical signal is applied through an analog to digital converter to a digital display.

In some weigh scales, for example commercial scales that are used in a somewhat continuous fashion for a series of weighing operations, power for the electronic digital display system can be manually turned on and left on until the series of weighing operations is completed. However, in scales that are used for single weighing operations at a time, and then only infrequently, such as in body weight scales used in homes, it is desirable to turn the electronic digital weighing system on and off for each weighing operation. In addition, in those electronic digital weighing systems which utilize a counter, it is generally desirable to reset the counter to zero before the start of each weighing operation.

The power for the electronic digital weighing system can of course be turned on and off by hand. However, hand control of power would be very inconvenient in a floor type scale since it would necessitate stooping over each time to turn the scale on and off. It has also been proposed, for example, as shown in U.S. Pat. 3,853,191 to use a switch that senses movement of the scale platform and is operated in response to the application of weight to the scale platform when the person steps on the scale. It has also been proposed, for example as shown in the aforementioned U.S. Pat. No. 3,927,726, to control the application of power of the weighing system indirectly in response to movement of the scale platform, that is in response to movement of a member that is moved by the scale platform when weight is applied.

Many scales, particularly those utiliziing electronic digital weighing systems, require only a very small movement of the scale platform between its zero and fully loaded positions. In weigh control systems in which power to the electronic digital weighing system is controlled directly or indirectly in response to movement of the scale platform, it is necessary to use switches capable of being actuated with only a small travel and, moreover, it is necessary to accurately adjust the switch so as to assure that it is properly actuated between its on and off position in response to movement of the scale platform. Moreover, the power controls using switches actuated directly or indirectly in response to application of weight to the scale platform are not suitable for use in some electronic digital weighing systems, for example the incremental type dial motion measuring system since it is necessary in such incremental weighing systems to start the weighing operation immediately upon the application of weight to the scale platform.

In those electronic digital weighing systems which utilize counters, it is generally desirable to reset the counters to zero before each weighing operation. Some weighing systems utilize hand operated reset buttons to reset the counters. However, such hand operated resets are objectionable on floor scales for the same reason set forth above in connection with the control of the power to the digital weighing system. It has also been proposed, for example as shown in the aforementioned U.S. Pat. No. 3,740,536 and 3,927,726 to use a reset circuit operated when the power source is actuated to reset the counters to zero.

SUMMARY OF THE INVENTION

It is the general object of the present invention to overcome the disadvantages of the prior art by providing a floor scale for measuring body weight of the type having an electronic digital weighing system and an improved weigh cycle control which enables the power for the electronic digital weighing system to be turned on for a weighing operation by the foot of a person before the person steps on the scale and conveniently in such a manner as to require only a small deviation in the foot motion usually involved in stepping on a floor scale. The weigh cycle control is also advantageously utilized to reset the counter in the electronic digital weighing system.

Accordingly, the present invention provides a floor scale for measuring body weight of the type including a base and a foot platform and an electronic digital weighing system with a weight cycle control including a kick member mounted on the scale base at one side of the scale for movement in a generally horizontal direction and adapted to be actuated by the foot of a person before mounting the foot platform, a momentary contact type switch mounted on the scale base for actuation by the kick member, and a timer operated by the momentary contact type switch for maintaining the application of the power to the electronic digital weighing system for a preselected time interval sufficient for a weighing operation. A means is also provided for resetting the counter to zero in response to operation of the switch.

These, together with other objects, features and advantages of the present invention will be more readily understood by reference to the following detailed description, when taken in connection with the accompanying drawings wherein:

FIG. 1 is a perspective view of a scale embodying the present invention and illustrating use of the same;

FIG. 2 is a plan view of the scale apparatus with parts broken away and shown in section to illustrate details of construction;

FIG. 3 is an enlarged vertical sectional view taken on the plane 3—3 of FIG. 2.

Figure 4:
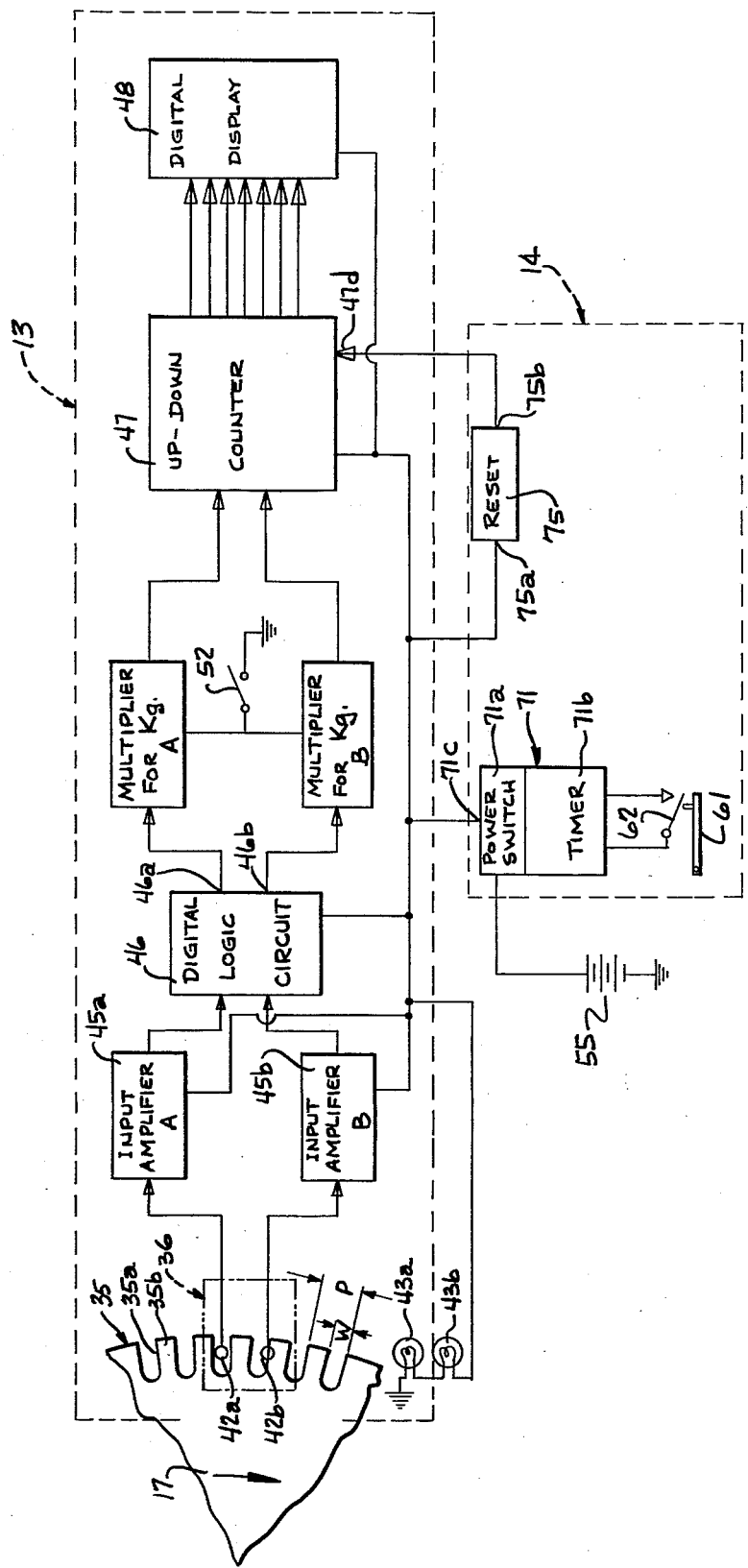
FIG. 4 is a block diagram illustrating the electronic digital weighing system and weigh cycle control.

The present invention is directed to improvements in floor scales of the type used for measuring body weight and which include a scale base 10, a foot platform 11 overlying the base and movable relative thereto in a generally vertical direction, and an electronic digital weighing system designated generally by the numeral 13 in FIG. 4. A weigh cycle control designated generally by the numeral 14 in FIG. 4 is provided for controlling the cycle for each weighing operation. In a preferred embodiment illustrated, the electronic digital weighing system is of the incremental type dial motion measuring system in which the scale dial cooperates with a sensor to produce a series of pulses as the scale dial is moved under the weight applied to the scale platform, and an up-down counter is used to count the pulses and actuate a digital display. The weigh cycle control is also arranged to reset the counter prior to each weighing operation.

Any suitable mechanical scale construction can be provided for suspending the foot platform 11 on the base 10 and for moving the scale dial 17 through an angle correlative with the weight applied to the scale. The platform suspension and lever system for rotating the scale dial is conveniently of the type disclosed in the patent to M. A. Provi et al, No. 3,666,031, disclosure of which is hereby incorporated by reference for a more complete illustration and description of the scale construction. In general, the platform suspension and lever system includes four platform suspensions 20 arranged in a generally rectangular pattern, with each platform suspension including a bell crank lever 21 having trunnions 21a mounted for pivotal movement on base brackets 22. The bell cranks 21 each have one arm 21b defining an upwardly opening V-notch horizontally offset from the trunnion 21a for engaging brackets on the scale platform to support the platform on the bell cranks. The bell cranks also include a second arm 21c defining a V-notch vertically offset from the trunnions 21a. The base brackets are arranged in a generally rectangular pattern on the base and links 24 engage and interconnect respective pairs of the bell cranks 21. The movement of the links 24 is applied through levers 26 to a slide 31 to move the same against the bias of a spring 32. A rack 33 is provided on the slide and engages a pinion 34 on a shaft 35 connected to the dial 17 to rotate the latter. It is to be understood that any other suitable platform suspension and lever system may be utilized for rotating the dial 17 through an angle correlative with the weight applied to the scale platform.

The scale dial 17 is provided with a single code track 35 that cooperates with a pulse generator 36 to produce a series of pulses as the scale dial is moved in response to the application of weight to the scale platform. The pulse generator 36 is preferably of the opto-electronic type and as best shown in FIG. 4, the code track 35 on the scale dial comprises a series of circumferentially spaced openings or notches 35a separated by teeth 35b and defining alternate light transmitting and light shielding areas. The notches or openings that define the light transmitting areas 35a are spaced apart around the disk a distance correlative with the units of weight to be measured and the slots may, for example, have a width w corresponding to the angular displacement of the dial produced by the application of two pounds of weight to the scale platform, with the pitch P between adjacent slots corresponding to four pounds. As best shown in FIG. 3, the pulse generator 36 includes a housing 40 having a slot 41 for receiving the periphery of the scale dial 17, and a pair of light sensitive devices such as photocells 42a and 42b are mounted in the housing at one side of the scale dial with light emitters such as lamps 43a and 43b mounted in the housing at the oppoiste side of the scale dial, and in axial alignment with respective ones of the photocells 42a and 42b. The lamps and photocells are conveniently mounted in aligned openings 40b and 40c formed in the housing at opposite sides of the slot 40a. When the scale dial is rotated, the photocell 42a produces a series of pulses and the photocell 42b also produces a series of pulses that are out of phase with the pulses produced by photocell 42a. The pulses from photocells 42a and 42b are applied through respective input amplifiers 45a and 45b to a digital logic circuit 46 which senses the number and phase relationship between the pulses from photocells 42a and 42b and produces a series of up pulses at the logic circuit output 46a when the scale dial is rotating in one direction, and a series of down pulses at the logic circuit output 46b, when the scale dial is rotated in the opposite direction. The up and down pulses are applied to a bi-directional or up-down counter 47 that adds the up pulses and subtracts the down pulses, and the output of the bi-directional counter is applied to an electronic digital display 48 which may for example be a bar-segment display of the light emitting diode type. As previously described, the spacing of the notches and teeth on the scale dial is advantageously correlated with the units of weight to be measured and may, for example, be correlated with the pounds of the English system of weights. If it is desired to also enable display of the weight in a different system of weights, for example in kilograms, multiplier circuits 51a and 51b may be provided for converting the add and subtract pulses from a number corresponding to pounds to a number corresponding to the equivalent in kilograms. Alternatively, a different scale 17 dial coded for kilograms, could be used. As diagrammatically shown in FIG. 4, the multipliers for kilograms are selectively operated under the control of a pound-kilogram switch 52.

The digital electronic weighing system 13 is adapted to be energized from a power source such as a battery 55 and the weigh cycle control 14 is provided to enable energization of the electronic digital weigh system just prior to stepping on the scale and to maintain the electronic digital weighing system energized for a time interval sufficient to complete a weighing operation. In addition, the weigh cycle control also effects resetting of the counter to zero prior to commencement of the weighing operation. The weigh cycle control includes a kick member 61 mounted on the scale base at one side thereof for movement in a generally horizontal direction at a location where it can be conveniently actuated by the foot of a person before stepping on the scale. As shown in FIGS. 1 and 2, the digital display 48 is located at the top of the scale for viewing when a person is standing on the scale facing forwardly, and the kick member is preferably located at the rear side of the scale. The kick member has a generally upright actuating face which can be easily contacted by the foot of the person before stepping on the scale and the kick member is preferably in the form of an elongated relatively rigid bar that extends along a substantial portion of the rear side of the scale. The bar is preferably supported for limited swinging movement along the generally horizontal path and, in the embodiment shown, comprises an elongated relatively rigid section 61a that is connected at one end through an integral hinge 61b to a mounting portion 61c. The mounting portion is attached to an upstanding flange on the base and, as shown, is provided with integral lugs 61d that extend through openings in the flange on the scale base. The kick bar has a portion 61e at its other end that extends forwardly through an opening in the flange on the scale base and a lateral portion 61f adapted to engage the inner side of the flange on the scale base to limit outward movement of the bar. The integral hinge is preferably molded with the mounting section 61c extending outwardly from adjacent end of the bar portion 61a, and the mounting portion 61c is then folded inwardly to the position shown in FIG. 2 to form a hinge that resiliently biases the bar portion 61a laterally outwardly of the scale. A momentary contact type switch 62 having normally open contacts is mounted on the scale base at a location to be acutated by the kick bar when it is moved inwardly.

A timed switch means designated 71 is provided for controlling the application of power from the battery to an output 71c connected to the several sub-circuits in the electronic digital weighing system including the lamps 42a, 42b, input amplifiers 45a, 45b, digital logic circuit 46, counter 47 and digital display circuit 48. The timed switch means 71 includes a power switch 71a and a timer circuit 71b for controlling operation of the power switch 71, and the timed switch means is actuated in response to closing of the kick switch 62. The timed switch means is of a type which will close the power switch 71a to apply power to the electronic digital weighing system in response to even momentary closing of the kick switch 62, and which will maintain the power switch closed or on for a preselected time interval controlled by timer 71b, for example fifteen to twenty seconds or more as desired, sufficient to complete a weighing operation, and thereafter open the power switch to interrupt the application of power to the digital weighing system. A timed switch means 71 is preferably of the electronic type, it being understood that the timed switch means could alternatively comprise an electro-mechanical relay actuated by kick switch 62 and having normally open contacts for controlling power to the output 71c and a time delay means operative when the contacts are closed, for delaying opening of the contacts for the selected time interval. Provision is also advantageously made for resetting the counter 47 prior to stepping on the scale and a reset circuit 75 is provided which is actuated either directly or indirectly in response to closing of the kick switch 62 to apply a reset pulse from the output 75b of the reset circuit co the input 47d of the counter, to reset the latter to zero. The reset 75 may conveniently be of the type which produces and applies a reset pulse to the counter in response to turning the power on at its input 75a so that the reset is actuated indirectly in response to operation of the kick switch 62.

From the foregoing it is thought that the construction and operation of the digital electronic weighing system and weigh cycle control will be readily understood. The kick bar 61 is mounted on the scale for movement in a horizontal direction and at a location where it can be conveniently actuated by the foot of a person before stepping on the scale and as an incident to the movement of the foot when mounting the scale. Thus, as a user raises one foot to step on the scale, it requires only a small deviation in the movement of his foot to touch the kick bar with his toe before placing the foot on the scale platform. The kick switch, when actuated, turns the power supply for the electronic digital weighing system on and maintains the power on for a preselected time interval sufficient for a weighing operation, and substantially independent of the duration of operation of the kick switch. In addition, the kick switch also operates a reset circuit to reset the counter before stepping on the scale. With this arrangement, it is an easy matter to turn the power for the electronic digital weighing system on and reset the counter before any weight is applied to the scale, to assure accurate measurement of the weight. Moreover, the timed weigh cycle control provides a uniform "on" time for ach weighing cycle and not only prevents excess battery drain but also assures that the electronic circuits are energized and hence heated for the same time interval in each weighing operation.

The embodiments of the invention in which an exclusive property or privilege is claimed are defined as follows:

1. In a floor scale for measuring body weight including a scale base and a foot platform overlying the base and movable relative thereto in a generally vertical direction, an electronic digital weighing system including weight sensing means and digital display means responsive to said weight sensing means for producing a digital display indicative of the weight applied to the scale platform, and power means for said electronic digital display system, the improvement comprising a weigh cycle control including a kick member mounted on said scale base at one side thereof for movement relative thereto in a generally horizontal direction and adapted to be actuated by the foot of a person before stepping on the foot platform, a momentary contact switch means mounted on the scale base for actuation by the kick member and timed switch means actuated by said momentary contact switch means for controlling application of power from said power means to said electronic digital display system, said timed switch means including means operative in response to actuation of the momentary contact switch means for initiating application power from said power means to said electronic digital display means, and timer means operative to continue the application of power to said electronic digital weighing system for a preselected time interval sufficient for a weighing operation.

2. A floor scale according to claim 1 wherein said weight sensing means includes means for producing a series of pulses correlative with the body weight applied to the foot platform, counter means for counting the pulses from said weight sensing means, and means responsive to said counter means for actuating the digital display to produce a visual display of the count, and reset means actuatable to reset the counter to zero, and means responsive to actuation of said momentary contact switch means for actuating said reset means.

3. A body-weight floor scale according to claim 1 wherein the digital display is located on the top of the scale for viewing when standing on the scale facing forwardly, and said kick member is located at the rear side of the scale.

4. A body-weight floor scale according to claim 3 wherein said kick member comprises an elongated generally horizontal bar.

5. A body-weight floor scale according to claim 4 wherein said bar is mounted on said scale base for swinging movement along a generally horizontal path.

6. A body-weight floor scale according to claim 1 wherein said weight sensing means includes a scale dial displaceable by an amount proportional to the weight on the scale platform member and having a plurality of alternate light transmissive areas and opaque areas, a light source at one side of the scale dial, a pair of light sensors at the other side of the scale dial and spaced apart in the direction of dial displacement to produce two out-of-phase pulse signals in response to displacement of the scale dial, said counter means including logic circuit means responsive to said two out-of-phase signals for producing a number of up pulses representative of movement of the scale dial in one direction and a number of down pulses representative of scale dial movement in the other direction and an up-down counter for adding the up pulses and subtracting the down pulses to produce an output correlative with the weight on the scale platform, reset means actuatable to reset the counter to zero, and means responsive to actuation of said momentary contact type switch means for actuating said reset means.

7. A body-weight floor scale according to claim 6 wherein the digital display is located on the top of the scale for viewing when standing on the scale facing forwardly, and said kick member is located at the rear side of the scale.

8. A body-weight floor scale according to claim 7 wherein said kick member comprises an elongated generally horizontal bar mounted for swinging movement relative to the scale base along a generally horizontal path.

* * * * *